United States Patent

Bode, Jr.

[15] 3,687,433
[45] Aug. 29, 1972

[54] PROTECTIVE DEVICE FOR CONVEYORS

[72] Inventor: Charles H. Bode, Jr., Upper St. Clair Twp., Allegheny Cty., Pa.

[73] Assignee: United States Steel Corporation

[22] Filed: Jan. 8, 1971

[21] Appl. No.: 104,886

[52] U.S. Cl. ............... 266/23 R, 198/193, 263/8 R
[51] Int. Cl. ........................................... B23k 7/02
[58] Field of Search........266/23 K, 23 M, 23 H, 23 F, 266/23 HH, 4 R, 5 R; 198/134, 193; 263/8 A, 8 R, 28, 50; 25/142 D, 142 R; 425/DIG. 108

[56] References Cited

UNITED STATES PATENTS

| | | | |
|---|---|---|---|
| 1,906,092 | 4/1933 | Peterson | 263/8 A |
| 2,583,002 | 1/1952 | Maxon | 266/23 F |
| 2,974,387 | 3/1961 | Tomkins | 25/142 D |
| 3,226,101 | 12/1965 | Balaz | 266/5 R X |
| 3,251,588 | 5/1966 | French | 266/4 R X |

Primary Examiner—J. Spencer Overholser
Assistant Examiner—John S. Brown
Attorney—Walter P. Wood

[57] ABSTRACT

A device for protecting a conveyor which carries metal workpieces as they undergo a flame-cutting operation. Intended particularly for conveyors which carry continuously cast products as segments are cut therefrom. Conveyor includes endless chains and slats extending between chains. Flame-cutting apparatus travels in synchronism with workpiece as it cuts and sometimes lies directly over a slat. Protective device overlies such slat and workpiece rests thereon. Damage is confined to protective device if flame-cutting apparatus lies directly thereover.

4 Claims, 4 Drawing Figures

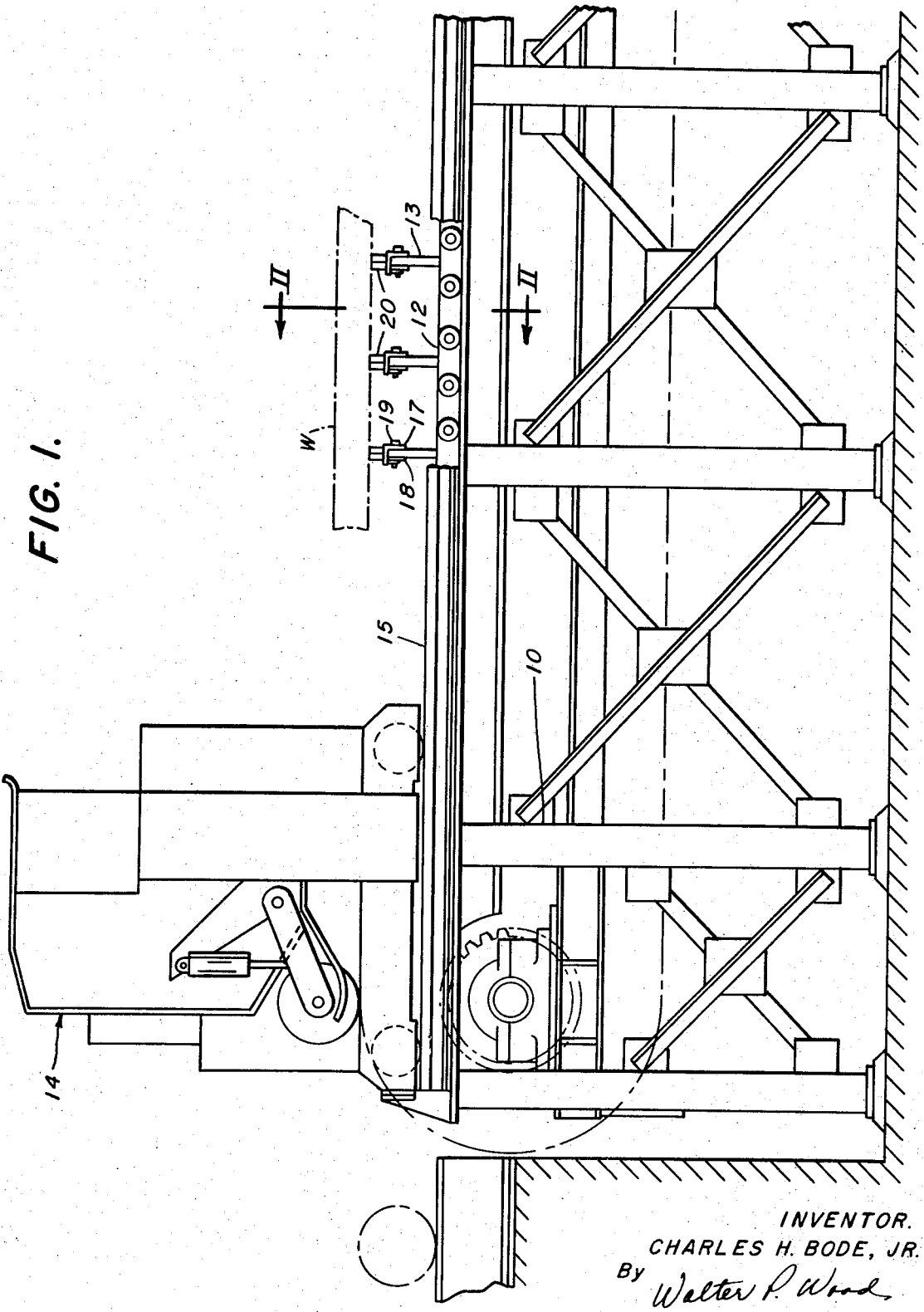

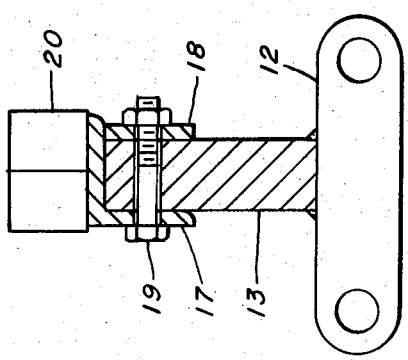
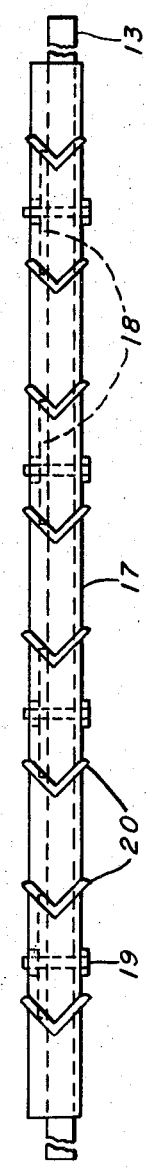
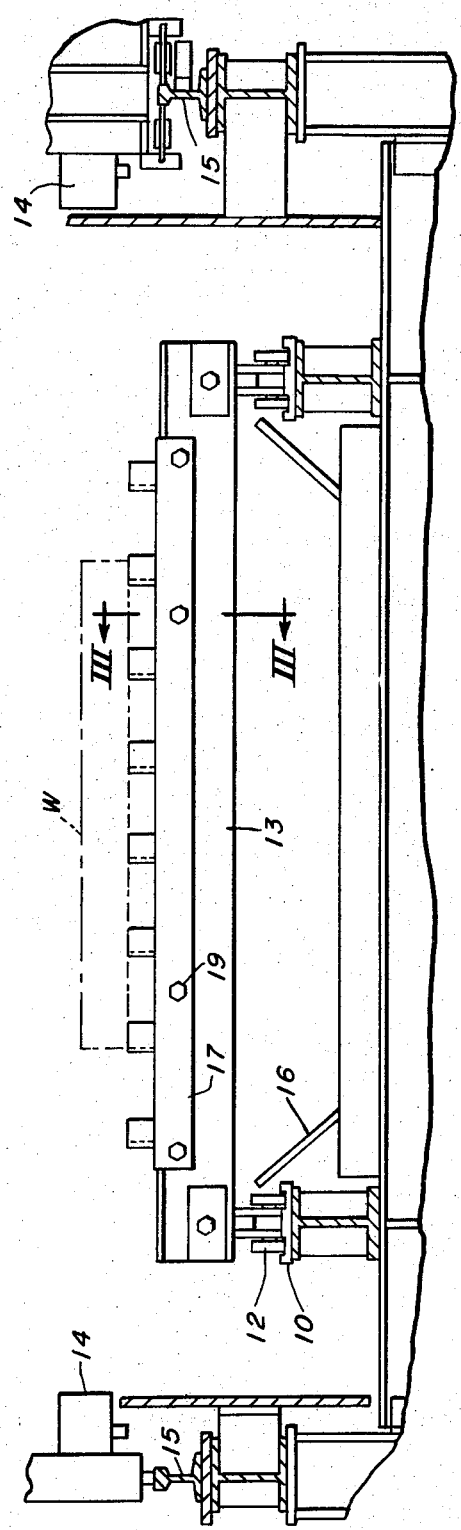
INVENTOR.
CHARLES H. BODE, JR.
By Walter P. Wood
Attorney

PROTECTIVE DEVICE FOR CONVEYORS

This invention relates to an improved device for protecting a conveyor which carries metal workpieces as they undergo flame-cutting.

Although my invention is not thus limited, the device is particularly useful when applied to a conveyor which carries a continuously cast product while segments of specified length are cut therefrom. Commonly the conveyor includes a pair of power-driven endless chains along its opposite sides and metal slats extending between chains. The product travels continuously as it comes from the casting machine, and it rests on the slats while it is being cut. After the proper length of product passes the flame-cutting apparatus, the apparatus is clamped to the product and travels in synchronism therewith during the cutting operation. One problem is that the cutting torches sometimes lie directly over one of the slats while they make their cut. When this happens, the flames may damage the slat, and also slag which forms as the product is cut collects on the slat.

An object of my invention is to provide an improved device for supporting a workpiece in spaced relation above the slats of a conveyor of the foregoing type, which device effectively protects the slats from the torches of the cutting apparatus.

A further object is to provide a protective device which I removably affix to a conveyor slat and replace readily whenever the device itself is burned or otherwise damaged.

A further object is to provide a protective device which minimizes the area of contact between a conveyor and a workpiece carried thereon, thereby minimizing formation of cold spots on a hot workpiece.

In the drawing:

FIG. 1 is a side elevational view partly broken away of a portion of a conveyor equipped with my protective devices;

FIG. 2 is a vertical section on line II—II of FIG. 1, omitting the cutting apparatus;

FIG. 3 is a vertical section on line III—III of FIG. 2; and

FIG. 4 is a top plan view of one of my protective devices.

FIGS. 1 and 2 show a portion of a conveyor which includes a fixed frame 10, a pair of endless chains 12 supported along opposite sides of the frame, and a plurality of relatively high narrow slats 13 mounted on the chains and extending transversely of the frame. The conveyor includes suitable mechanism (not shown) for driving the chains. The slats support a workpiece W, such as a product of indefinite length formed in a continuous-casting operation. A flame-cutting apparatus 14 is supported on rails 15 for travel lengthwise of the conveyor above the workpiece. The cutting apparatus travels in synchronism with the workpiece as it cuts a segment therefrom and then returns quickly to its starting position to await the next cut. This form of cutting apparatus is known; hence I have not included a detailed showing. Reference can be made to McDermott U.S. Pat. No. 3,227,432 or to Greenberger U.S. Pat. No. 3,443,805 for showings of two examples of such apparatus. The cutting operation produces slag, which falls into a chute 16 beneath the carrying flight of the conveyor (FIG. 2).

The protective device of my invention includes a continuous angle iron 17, the respective legs of which overlie the outer face and one side face of a slat 13. Flat bar segments 18 overlie the other side face of the slat. A plurality of bolts 19 removably affix the angle iron and bar segments to the slat. On the carrying flight of the conveyor, the leg of the angle iron overlying the outer face of the slat is horizontal. To this leg I weld a plurality of upstanding short, similar-length angle irons 20. The legs of angle irons 20 lie at approximately 45° angles to the edges of angle iron 17 (FIG. 4). I equip all the slats with similar protective devices.

In operation, the workpiece W rests on the upper edges of the angle irons 20. If the torches of the flame cutting apparatus 14 happen to lie directly over a slat 13 while they make a cut, any damage is confined to the protective device. The angle irons 20 tend to divert slag to the chute 16 when slag falls on the protective device. A damaged protective device is easily and cheaply removed and replaced. If the workpiece is a continuously cast product, it is at a high temperature when the conveyor receives it. The edges of the angle irons 20 have a relatively small area of contact with the workpiece and thus minimize formation of cold spots.

I claim:

1. In combination with a conveyor and a flame-cutting apparatus supported to travel lengthwise of the conveyor thereabove, said conveyor comprising:
   a fixed frame;
   a pair of endless chains supported on said frame along its opposite sides; and
   a plurality of relatively high narrow slats mounted on the chains and extending transversely of the frame;
   said conveyor being adapted to support a workpiece while said apparatus travels in synchronism therewith and cuts the workpiece;
   protective devices for said slats, each of said devices comprising:
   an angle iron overlying the outer face and one side face of one of said slats;
   means removably affixing said angle iron to its slat; and
   a plurality of upstanding short similar length pieces fixed to the portion of the angle iron overlying the outer face of the slat;
   said pieces being adapted to have the workpiece rest thereon, whereby damage is confined to the protective device when the cutting means of said apparatus lies directly over a slat during a cutting operation.

2. A combination as defined in claim 1 in which said pieces are angle irons, the legs of which lie at angles of approximately 45° to the edges of said first-named angle iron.

3. A combination as defined in claim 2 further including a chute beneath said conveyor for receiving slag produced in the cutting operation, said second-named angle irons being adapted to divert slag which falls on the protective device into said chute.

4. A combination as defined in claim 1 in which the means affixing said angle iron to its slat includes a plurality of bar segments overlying the other side face of the slat, and bolts extending through said bar segments, slats and angle iron.

* * * * *